US010219328B2

United States Patent
Comte et al.

(10) Patent No.: US 10,219,328 B2
(45) Date of Patent: Feb. 26, 2019

(54) ALKALI-FREE ALUMINOSILICATE GLASSES, SUITABLE AS SUBSTRATE FOR INDUCTION HEATING COOKTOPS APPLICATIONS

(71) Applicant: CORNING INCORPORATED, Corning, NY (US)

(72) Inventors: Marie Jacqueline Monique Comte, Fontenay aux Roses (FR); Philippe Lehuede, Dammarie-les-Lys (FR)

(73) Assignee: EUROKERA, Chateau-Thierry (FR)

( * ) Notice: Subject to any disclaimer, the term of this patent is extended or adjusted under 35 U.S.C. 154(b) by 0 days.

(21) Appl. No.: 14/903,743

(22) PCT Filed: Jul. 8, 2014

(86) PCT No.: PCT/US2014/045693
§ 371 (c)(1),
(2) Date: Jan. 8, 2016

(87) PCT Pub. No.: WO2015/009483
PCT Pub. Date: Jan. 22, 2015

(65) Prior Publication Data
US 2016/0174301 A1    Jun. 16, 2016

(30) Foreign Application Priority Data
Jul. 16, 2013 (FR) ..................... 13 56997

(51) Int. Cl.
| C03C 3/087 | (2006.01) |
| C03C 3/091 | (2006.01) |
| H05B 6/12 | (2006.01) |
| C03C 3/093 | (2006.01) |
| C03C 4/20 | (2006.01) |
| H05B 3/74 | (2006.01) |

(52) U.S. Cl.
CPC .......... *H05B 6/1209* (2013.01); *C03C 3/087* (2013.01); *C03C 3/093* (2013.01); *C03C 4/20* (2013.01); *H05B 3/74* (2013.01)

(58) Field of Classification Search
CPC ......... C03C 3/085; C03C 3/087; C03C 3/091; C03C 3/093; H05B 3/74; H05B 6/12; H05B 6/1209
See application file for complete search history.

(56) References Cited

U.S. PATENT DOCUMENTS

| 5,116,788 A | 5/1992 | Dumbaugh, Jr. |
| 5,770,535 A | 6/1998 | Brix et al. |
| 5,851,939 A | 12/1998 | Miwa |
| 6,248,678 B1 | 6/2001 | Pinckney |
| 6,468,933 B1 | 10/2002 | Narita et al. |
| 6,707,526 B2 | 3/2004 | Peuchert et al. |
| 7,671,303 B2 | 3/2010 | Vilato et al. |
| 7,727,916 B2 | 6/2010 | Peuchert et al. |
| 9,018,113 B2 | 4/2015 | Siebers et al. |
| 2002/0011080 A1 | 1/2002 | Naka et al. |
| 2005/0095550 A1 | 5/2005 | Kim et al. |
| 2006/0160691 A1 | 6/2006 | Kawaguchi et al. |
| 2007/0243992 A1 | 10/2007 | Fechner et al. |
| 2008/0127679 A1 | 6/2008 | Nishizawa et al. |
| 2009/0129061 A1 | 5/2009 | Fechner et al. |
| 2009/0294773 A1 | 12/2009 | Ellison |
| 2010/0045164 A1 | 2/2010 | Fechner et al. |
| 2012/0010278 A1 | 1/2012 | Schlegel et al. |
| 2012/0033693 A1 | 2/2012 | Li et al. |
| 2012/0040211 A1 | 2/2012 | Murata et al. |
| 2012/0114955 A1 | 5/2012 | Almoric et al. |

FOREIGN PATENT DOCUMENTS

| CN | 1590330 A | 3/2005 |
| CN | 102515524 | 6/2012 |
| GB | 2079119 | 7/2010 |
| JP | 09156953 | 6/1997 |
| JP | 2003137591 A | 5/2003 |

OTHER PUBLICATIONS

Machine Translation of JP 9-156953, Jun. 17, 1997.*
International Search Report and the Written Opinion of the International Searching Authority; PCT/US2014/045693; dated Oct. 2, 2014; 10 Pages.
English Translation of CN201480051098.1 Notice of First Office Action dated May 30, 2018; 7 Pages; Chinese Patent Office.
Masayuki Yamane et al. "Glass Engineering Handbook", Asakura Publishing Co./Kunizoh Asakura, Japan, Jul. 5, 1999, 1st ed. vol. 1. pp. 75-76.
English Translation of JP2016526980 Office Action dated Aug. 14, 2018, Japan Patent Office, 12 Pgs.

* cited by examiner

*Primary Examiner* — Elizabeth A. Bolden
(74) *Attorney, Agent, or Firm* — Dinsmore & Shohl LLP

(57) ABSTRACT

Aluminosilicate glasses whose composition is free of alkali metals and contain, as a weight percentage of oxides, 60 to 70% $SiO_2$, 13 to 22% $Al_2O_3$, 0 to 9% $B_2O_3$, 1 to 6% MgO, 0 to 5% CaO, 1 to 5% BaO, 2 to 12% ZnO, and 0 to 3% SrO, wherein $Al_2O_3+B_2O_3+ZnO>23\%$ and $B_2O_3+MgO-CaO-BaO-SrO<6\%$. The glasses exhibit a low coefficient of thermal expansion (CTE) and strong acid and alkali durabilities, and may be used in substrates for induction cooktops.

11 Claims, No Drawings

ALKALI-FREE ALUMINOSILICATE GLASSES, SUITABLE AS SUBSTRATE FOR INDUCTION HEATING COOKTOPS APPLICATIONS

CROSS-REFERENCE TO RELATED APPLICATIONS

This application claims the benefit of priority under 35 U.S.C. § 119 of French Patent Application Serial No. 1356997 filed on Jul. 16, 2013, the entire content of which is hereby incorporated by reference.

BACKGROUND

The present disclosure relates to aluminosilicate glasses. Its main subject matter more specifically concerns aluminosilicate glasses whose compositions may or may not contain boron, and are free of alkali metals.

Said glasses have properties of interest and more particularly a low coefficient of thermal expansion (CTE). With reference to these properties of interest, particular uses of said glasses include substrates for cooktops of induction heating cooking devices. The disclosed glasses have been developed within the context of cooktops for induction heating cooking devices but are in no way limited to the said context.

Within this context, lithium aluminosilicate type glass-ceramic plates are chiefly proposed. Said glass-ceramic plates have been described in numerous documents and in particular in U.S. Pat. No. 7,671,303 and patent application WO 2012/010278.

Three types of such plates in particular are currently marketed: (i) dark plates (black), bulk-colored glass ceramics (of lithium aluminosilicate type) containing a solid solution of β-quartz as a main crystalline phase; (ii) white plates, semi-opaque glass ceramics (of lithium aluminosilicate type) containing a solid solution of β-spodumene as a main crystalline phase; and (iii) transparent plates, colorless glass ceramics (of lithium aluminosilicate type) containing a solid solution of β-quartz as a main crystalline phase having a colored-decorative coating on their lower surface (main lower surface intended to be arranged facing the heating elements).

For this third type of plate, more specifically for the substrate in transparent colorless glass ceramics, there is much room for improvement notably regarding the type of fining agent (of the precursor glass) used to obtain the glass ceramic. Arsenic oxide ($As_2O_3$), a toxic product, is still widely used. In lieu and stead of said arsenic oxide, increasing use is made of tin oxide ($SnO_2$), which imparts a yellowish coloring to the glass ceramic. This undesirable yellowish coloring is the result of Ti—Fe, Sn—Fe and Sn—Ti interactions (via charge transfer). Persons skilled in the art well know that the compositions of precursor glasses of glass-ceramics may contain iron and generally $TiO_2$ as a nucleating agent. Associated with such glass-ceramics are elevated costs including manufacturing costs (including price of raw materials and production costs for the manufacturing process including a ceramming step).

The inventors, seeking such improvements took a fully original approach based on the highly advantageous substitution of said prior art plates in glass-ceramic (of lithium aluminosilicate type) by plates in aluminosilicate glass.

The inventors have surprisingly found aluminosilicate glasses whose composition is free of alkali metals, having the required properties for said highly advantageous substitution. It can henceforth be noted here that the substitution is most advantageous insofar as it obviates the implementation of a ceramming step, and therefore the use of nucleating agent(s), the use of lithium oxide ($Li_2O$: a costly raw material) and the use of arsenic oxide (tin oxide being notably fully suitable as a fining agent).

Numerous aluminoborosilicate glasses have been described whose compositions are free of alkali metals, more particularly for application in the technical field of displays (screens, televisions, etc.). Said aluminoborosilicate glasses have especially been described in the following patent documents: U.S. Pat. No. 5,116,788, EP 1 911 725, US 2007/0243992, WO 2004/020356, US 2009/0294773, U.S. Pat. No. 7,727,916, US 2009/0129061, EP 0 787 693, US 2012/0033693 and CN 102515524. In general they have thermal expansion coefficient values higher than $30 \times 10^{-7}/°C$. They do not have the composition of the glasses as disclosed herein.

SUMMARY

Embodiments of the present disclosure relate to aluminosilicate glasses that are transparent, entirely colorless when there are no coloring agent(s) in their composition (therefore not having the aforementioned yellowish coloring) or colored through the presence of coloring agents in their composition, and which exhibit the required properties. They are characterized by a very low coefficient of thermal expansion (CTE). They also have acid and alkali chemical durabilities of interest. On account of their melt temperature and viscosity at liquidus temperature they can easily be obtained using a forming step via rolling under industrial conditions. In embodiments, the glass compositions are free of $TiO_2$.

It is therefore to the credit of the inventors that such glasses are proposed which exhibit particularly good performance for the above-mentioned application (cooktops for cooking by induction heating). It is to be noted, however, that the use of said glasses is not limited to this application.

In embodiments, aluminosilicate glasses, whose compositions are free of alkali metals and, expressed as weight percentages of oxides, comprise 60 to 70% $SiO_2$, 13 to 22% $Al_2O_3$, 0 to 9% $B_2O_3$, 1 to 6% MgO, 0 to 5% CaO, 1 to 5% BaO, 2 to 12% ZnO, and 0 to 3% SrO; wherein $Al_2O_3$+$B_2O_3$+ZnO>23%, and $B_2O_3$+MgO−CaO−BaO−SrO<6%. Compositional percentages are expressed herein on a per weight basis unless otherwise indicated. The disclosed glasses are free or substantially free of crystalline content.

DETAILED DESCRIPTION

The disclosed aluminosilicate glasses (aluminoborosilicate glasses if the composition includes boron) are free of alkali metals (with the exception of inevitable traces, i.e., <1000 ppm). It is effectively impossible to fully exclude the presence of such traces, most particularly within a context of recycled raw materials used in the charge. The disclosed glasses characteristically have the above-indicated weight composition and in addition their contents of $Al_2O_3$, $B_2O_3$, ZnO, MgO, CaO, BaO and SrO are such that they meet the two conditions specified above.

The first of these two conditions, for glasses having the indicated composition, imparts a low coefficient of thermal expansion (CTE), i.e., lower than $30 \times 10^{-7}/°C$., between 20 and 300° C. Glasses having such CTE values are fully suitable as substrates for plates 4 mm thick, said plates being fully suitable as cooktops for induction heating cooking devices. The cooktops resist thermal shock and do not deform or break over the temperature range of 0-400° C.

The second of these conditions imparts chemical durabilities to the glasses against acids (half loss in weight per unit surface area) and against alkalis (weight loss per unit surface area) that are advantageous, i.e., less than 400 mg/dm$^2$. Chemical acid durability and alkali durability are respectively measured as per standards DIN 12-11 and ISO 695. Such durability values are fully compatible with the use of the said glasses as substrates for cooktops for induction heating cooking devices.

With reference to the above-indicated weight composition, the following comments can be made. The composition of the glasses is free of alkali metals (see above) most particularly with reference to the sought-after low thermal expansion coefficient values. The composition is therefore free of $Li_2O$; this being additionally advantageous in terms of the cost of the raw materials. The content of $SiO_2$ is 60% or higher having regard to the sought-after good values of durability and low coefficient of thermal expansion. However, the $SiO_2$ content is not higher than 70% with regard to the viscosity of the glass and hence advantageous preparation conditions thereof. In embodiments, the $SiO_2$ content of the glasses is between 65 and 70%. The $Al_2O_3$ content is such as indicated above to obtain advantageous conditions for preparing the glass. $Al_2O_3$, in the indicated content, allows glass viscosity of 30 Pa·s (300 poises) to be obtained at temperatures lower than 1700° C. The $Al_2O_3$ content in embodiments is between 15 and 20%. The glasses may or may not contain boron (e.g., $B_2O_3$). It is considered that they do not contain boron if the content thereof in the composition is less than 1000 ppm (in which case the term traces is used, due to the use of recycled raw materials in the charge). If boron is present, in general at least 0.1% and advantageously at least 1% $B_2O_3$ is included. The effect of boron is to reduce the coefficient of thermal expansion and viscosity of the glass. If present in too high a quantity ($B_2O_3$ >9%) the durabilities of the glasses are deteriorated. The weight composition of the glasses may contain 0 to 5% $B_2O_3$. The MgO content is at least 1%. MgO acts to reduce the viscosity of the glass and viscosity at liquidus temperature. The content is not too high (MgO>6%) as otherwise the chemical durabilities of the glass would be severely affected. The weight composition of the glasses in embodiments contains 1 to 4% MgO; BaO, CaO and SrO. These components are present to inhibit or prevent the phenomenon of phase separation with respect to chemical durabilities. The presence of BaO in embodiments is essential. BaO is useful in reducing the viscosity of the glass. The BaO content is 1 to 5%, e.g., 1.5 to 4%. SrO may be included up to a content of 3%. However, in embodiments the glass compositions are free of SrO (with the exception of inevitable traces, i.e., up to 1000 ppm) insofar as this compound is costly. Traces of SrO may result from the presence of recycled raw materials in the charge. The CaO content may range up to 5%. In embodiments, the CaO content does not exceed 3%. It is not necessarily included. An excess of these types of compound (BaO+CaO+SrO>13%) is detrimental to the desired low values of thermal expansion coefficient. The glass compositions may contain zinc (ZnO≥2%). The chief effect of this compound is to reduce the coefficient of thermal expansion. It is not present in excess (ZnO>12%) to prevent devitrification. The ZnO content in embodiments is between 5 and 12%.

Example contents of each of the ingredients have been indicated above. These contents are to be considered independently of each other or in combination with each other.

According to one embodiment, the disclosed glasses comprise 65 to 70% $SiO_2$, 15 to 20% $Al_2O_3$, 0 to 5% $B_2O_3$, 1 to 4% MgO, 0 to 3% CaO, 1.5 to 4% BaO, and 5 to 12% ZnO.

The glasses contain or may contain (see the indicated 0%) the above-identified ingredients in their composition, in the above-indicated contents paying due heed to the two above-specified conditions.

In general, the glass compositions include up to at least 96% of their weight, even up to at least 98% of their weight of the above-listed ingredients. Their composition may well be 100% (by weight) formed of said ingredients. However, the presence of other ingredients cannot be full excluded, evidently in limited quantities, which do not substantially affect the properties of the glasses concerned (most particularly the coefficient of thermal expansion and chemical durabilities). As to other ingredients mention can be made, but in no way limited to, fining agents and coloring agents.

The compositions of the glasses do not necessarily contain a fining agent. The presence of a fining agent (at least one fining agent) may be required however with respect to the desired quality of the glass (bubble-free). When present, the content (expressed as oxide(s) weight percent) of the at least one fining agent is generally no more than 1%; and in general it is at least 0.1%. When the effect thereof is desired, its content is between 0.1% and 0.5%. In embodiments, the use of conventional fining agents ($As_2O_3$ and $Sb_2O_3$) is avoided. An example fining agent is tin oxide ($SnO_2$). Other fining agents such as chlorine and cerium oxide ($CeO_2$) may be used. Provision is then expressly made, but not limited thereto, for the combined or separate presence of $SnO_2$, chlorine and $CeO_2$ in the glass compositions as disclosed herein.

The disclosed glasses may be used as a constituent material in cooktops, for example substituting for transparent, colorless glass-ceramic materials, though the glasses may be used in other contexts, such as with bulk coloring. The above-indicated compositions may therefore additionally contain at least one coloring agent e.g., cobalt, nickel, chromium, manganese and/or vanadium. Said at least one coloring agent may be included in an efficient quantity, generally between 0.001 and 2% by weight (expressed as oxide(s) %).

In embodiments the disclosure relates to glasses whose weight composition is formed 100 weight percent of the above-listed ingredients and of at least one additional ingredient selected from fining agents (the at least one fining agent, if present in the composition, being present at a content generally of between 0.1% and 1%) and coloring agents (the at least one coloring agent, if present in the composition, being present at a content generally of between 0.001% and 2% by weight).

It is recalled that the glasses are of particular interest in that they exhibit a low coefficient of thermal expansion, i.e., lower than $30 \times 10^{-7}$/° C., over the range of 20 to 300° C. The coefficient of thermal expansion is generally between 24 and $30 \times 10^{-7}$/° C. In embodiments, the coefficient of thermal expansion is lower than $27 \times 10^{-7}$/° C. In addition to the coefficient of thermal expansion, the glasses exhibit acid (half loss in weight per unit surface area) and alkali (weight loss per unit surface area) chemical durabilities of interest, i.e., less than 400 mg/dm$^2$, e.g., less than 250 mg/dm$^2$ measured as per standard DIN12-116 and standard ISO 695 respectively.

In this respect, the disclosed glasses are particularly suitable as substrates for cooktops in induction heating cooking devices.

In the absence of an optional coloring agent, the disclosed glasses are virtually entirely colorless due at least in part to the absence of $TiO_2$ and the absence of crystals in their composition. The "virtually entirely colorless" character can be quantified such that the disclosed glasses (as polished 4 mm thick samples) have the optical properties hereafter listed: Tv>90%; L*>95; a* between [−0.5, +0.2], e.g., [−0.3, +0.1]; b* between [−0.1, +1.0], e.g., [−0.1, +0.5]; and YI<2, e.g., <1.

These parameters Tv (total integrated transmission in the visible spectral range of 380-780 nm), L*, a* b* (color coordinates into the CIELAB color space), and YI (yellow index) are familiar to the one skilled in the art. L* and Tv define the lightness of the material. Higher values correspond to higher transparency and clarity. Concerning the yellow index, the lower its value, the more colorless the material.

The indicated values correspond to results obtained with a UV-visible-near IR double beam spectrophotometer equipped with an integrating sphere. Tv, L*, a* and b* are calculated with illuminant D65 and 2° observer. The yellow index (YI) is calculated with the following equation given by the standard ASTM E313: YI=[100×(1.2985X−1.1335Z)]/Y wherein X, Y et Z represent the tri-stimulus coordinates of the sample in the color space CEI 1931, calculated for a D65 illuminate and a 2° observer.

The glasses can be readily obtained on account of their viscosity at liquidus temperature and melt temperature. They generally have a viscosity at liquidus temperature higher than 300 Pa·s (3000 poises), e.g., higher than 500 Pa·s (5000 poises) and a viscosity of 30 Pa·s (300 poises) at a temperature lower than 1700° C.

The glasses also have relatively high glass transition temperatures. This is of advantage in the context of plates made of said glasses, for decoration thereof with frits.

Persons skilled in the art will undoubtedly appreciate the advantage of the glasses, both from an economic viewpoint and from the viewpoint of pleasing appearance.

It is recalled that with reference to the technical problem of providing glass-ceramic plates that are transparent and colorless, the disclosed glasses represent a particularly advantageous alternative in that they are free of alkali metals (more particularly $Li_2O$), and can be manufactured without implementing a ceramming step and also possibly without the use of arsenic oxide. In embodiments, the glasses are transparent and entirely colorless such that plates made of said glasses are fully suitable as substrates for induction heating cooktops.

The field of application of the disclosed glasses is not limited to the field of transparent, colorless cooktops (e.g., cooktops having a coating). The glasses themselves may be colored. In general, the glasses may be used in contexts that benefit from a material having low coefficient of thermal expansion and strong chemical durabilities.

Their use is recommended, but in no way limited thereto, as a substrate for an element chosen from among a cooktop for induction heating cooking device and a glazing. For example, large-size glazings subjected to strong heat are likely to undergo major deformation. A low coefficient of thermal expansion of its constituent glass is therefore valuable. Mention has been made of a substrate for cooktops insofar as the presence of a coating is not excluded or may be expressly provided. With respect to glazings, they may possibly comprise at least one layer (an anti-reflective layer for example) on said substrate.

The present disclosure also relates to articles at least partly comprising the aluminosilicate glasses disclosed above. Example articles include cooktops for induction heating cooking devices and glazings of that type.

Example methods for obtaining the disclosed glasses comprise melting a batch mixture of raw materials having the desired glass composition, optionally fining the molten glass, and cooling the molten glass. Methods for obtaining an article comprise melting a batch mixture of raw material, optionally fining the molten glass, cooling the molten glass while simultaneously shaping it into the desired form, and annealing and/or cooling the shaped glass. The resultant article may be decorated.

Glass articles as disclosed herein may be substituted in certain applications for glass-ceramic materials.

It is now proposed to illustrate various embodiments with the following examples, more specifically Examples 1 to 5 and comparative Examples C1 to C11. To produce 1 kg batches of glass, the raw materials in the proportions (expressed as oxide proportions) indicated in the first part of Tables 1 and 2 below were carefully mixed.

The mixtures were placed in platinum crucibles for melting. The crucibles containing said mixtures were then placed in a furnace pre-heated to 1550° C. where they were subjected to the following melt cycle: hold at 1550° C. for 15 min; temperature rise from 1550° C. to 1650° C. in 30 min; and hold at 1650° C. for 390 min.

The crucibles were then taken out of the furnace and the molten glass poured onto a preheated steel plate. The glass was rolled thereupon to a thickness of 5 mm. Glass plates were thus obtained. They were annealed at 750° C. for one hour and then gently cooled.

The properties of the glasses obtained are given in the second part of Tables 1 and 2 below.

In Tables 1 and 2, CTE indicates the coefficient of thermal expansion between 20 and 300° C.

Tg (° C.) is the glass transition temperature. It is confirmed that the disclosed glasses have relatively high Tg values (which provides wider possibilities regarding the choice of decorative frit compositions in the event that provision is made to decorate one of the sides of the panel with said frit).

The indicated acid and alkali durability values were respectively measured using the DIN 12-116 standard and ISO 695 standard.

$T_{liq}$ (° C.) is the liquidus temperature. The liquidus is given for a range of associated temperatures and viscosities (see also Viscosity $T_{liq}$ (poises) given in Tables 1 and 2). The highest temperature corresponds to the minimum temperature at which no crystal is observed, the lowest temperature corresponds to the maximum temperature at which crystals are observed.

$T_{300\ poises}$ (° C.) is the temperature at which the viscosity of the glass is 300 poises (30 Pa·s).

Optical properties of example glasses are summarized in Table 3.

The optical properties of these glasses were compared with those of transparent, colorless glass-ceramics. The comparative glass-ceramic is a β-quartz, lithium aluminosilicate type containing $Li_2O$ and $TiO_2$ in its composition.

Without wishing to be bound by theory, the low values of the yellow indexes of the disclosed glasses are believed to be the result of the absence of $TiO_2$ and of crystals in the glasses.

Examples 1 to 5 therefore illustrate various embodiments. The glasses in Examples 1, 2, 3 and 5 are aluminoborosilicate glasses. The glass in Example 4 does not contain any boron in its composition.

The glasses in each of the said examples show CTE<30× $10^{-7}$/° C.; chemical durability values lower than 250 mg/dm²; viscosity of 300 poises at a temperature lower than 1700° C. ($T_{300\ poises}$<1700° C.); and viscosity at liquidus temperature higher than 3000 poises (Viscosity $T_{liq}$>3000 poises).

With reference to their value (range of values) of viscosity at liquidus temperature, the glasses in Examples 1 and 2 are preferred. Applicant fully masters the forming of glasses having viscosity in the region of 3000 poises. To prevent any devitrification, glasses should be used having a minimum viscosity at liquidus temperature of more than 3000 poises, e.g., more than 5000 poises. The glass of Example 5 is also very interesting from that point of view (i.e., value of viscosity at liquidus temperature) but slightly less interesting from the point of view of the value of its CTE.

With reference to the comparative examples C1 to C11, the following comments are made.

The composition of the glass in comparative Example C1 does not contain BaO. The compositions of the glasses in comparative Examples C4 and C7 do not contain MgO. The glasses in comparative Examples C1, C4 and C7 display $T_{300\ poises}$>1700° C.

The composition of the glass in comparative Example C2 is such that the sum $Al_2O_3+B_2O_3+ZnO$, equaling 22, is less than 23. This glass has a CTE value higher than 30×$10^{-7}$/° C.

The compositions of the glasses in comparative Examples C5 and C6 contain too much $B_2O_3$ (more than 9%). The acid durability of these glasses is not satisfactory.

The composition of the glass in comparative Example C11 contains too much ZnO (more than 12%). It does not have a satisfactory viscosity at liquidus temperature (devitrification problem).

The composition of the glass in comparative Example C9 does not contain BaO or ZnO. The compositions of the glasses in comparative Examples C3, C8, C9 and C10 are such that the sums $B_2O_3+MgO-CaO-BaO-SrO$ is higher than 6. The corresponding glasses do not exhibit satisfactory chemical durabilities.

TABLE 1

| (Examples) | | | | | |
|---|---|---|---|---|---|
| Examples | 1 | 2 | 3 | 4 | 5 |
| Composition (weight %) | | | | | |
| $SiO_2$ | 66.9 | 66.9 | 66.2 | 66 | 65.7 |
| $Al_2O_3$ | 16.3 | 16.3 | 18.5 | 18.6 | 14 |
| $B_2O_3$ | 4 | 4 | 2 | | 8 |
| CaO | | 1 | | 1 | 3 |
| MgO | 3.5 | 2 | 3.5 | 2 | 3 |
| $SnO_2$ | 0.3 | 0.3 | 0.3 | 0.3 | 0.3 |
| BaO | 2.5 | 2 | 2.5 | 2 | 2.5 |
| SrO | | | | | |
| ZnO | 6.5 | 7.5 | 7 | 10.1 | 3.5 |
| $Al_2O_3 + B_2O_3 + ZnO$ | 26.8 | 27.8 | 27.5 | 28.7 | 25.5 |
| $B_2O_3 + MgO - CaO - BaO - SrO$ | 5 | 3 | 3 | −1 | 5.5 |
| Properties | | | | | |
| CTE (×$10^{-7}$/° C.) | 25 | 24.5 | 24.8 | 24.9 | 28.7 |
| Tg (° C.) | 749 | 743 | 776 | 782 | 717 |
| Acid durability (half loss in weight – mg/dm²) | 82 | 84.7 | 31.8 | 3.3 | 225 |
| Alkali durability (loss in weight – mg/dm²) | | 174 | | | |
| $T_{liq}$ (° C.) | 1350-1400 | 1350-1400 | 1400-1430 | 1430-1450 | 1250-1300 |
| Viscosity $T_{liq}$ (poises) | 7500-10500 | 9500-20000 | 3720-5570 | 4000-5000 | 30000-75000 |
| $T_{300\ poises}$ (° C.) | 1689 | 1699 | 1663 | 1676 | 1674 |

TABLE 2

| (Comparative examples) | | | | | | |
|---|---|---|---|---|---|---|
| Comparative examples | C1 | C2 | C3 | C4 | C5 | C6 |
| Composition (weight %) | | | | | | |
| $SiO_2$ | 69 | 67.7 | 67.7 | 67.7 | 66.2 | 66.7 |
| $Al_2O_3$ | 14 | 14 | 14 | 14 | 14 | 14 |
| $B_2O_3$ | 6 | 8 | 8 | 8 | 12 | 12 |
| CaO | 4.7 | 4 | 4 | 4 | | 3 |
| MgO | 3 | 3 | 3 | | 2 | 4 |
| $SnO_2$ | 0.3 | 0.3 | 0.3 | 0.3 | 0.3 | 0.3 |
| BaO | | 3 | | 2 | 2.5 | |
| SrO | | | | | | |
| ZnO | 3 | | 3 | 4 | 3 | |
| $Al_2O_3 + B_2O_3 + ZnO$ | 23 | 22 | 25 | 26 | 29 | 26 |
| $B_2O_3 + MgO - CaO - BaO - SrO$ | 4.3 | 4 | 7 | 2 | 11.5 | 13 |
| Properties | | | | | | |
| CTE (×$10^{-7}$/° C.) | 28.7 | 30.3 | 27.8 | 26 | 24.2 | 27.1 |
| Tg (° C.) | 730 | 738 | 715 | 719 | | 707 |
| Acid durability (half loss in weight – mg/dm²) | 235 | 35.4 | 1374 | 75.4 | 980 | 765 |
| Alkali durability (loss in weight – mg/dm²) | 211 | 142 | 297 | 68.9 | | <408 |

TABLE 2-continued (Comparative examples)

| | | | | | |
|---|---|---|---|---|---|
| $T_{liq}$ (° C.) | 1300-1350 | 1200-1250 | 1200-1250 | 1250-1300 | 1150-1200 |
| Viscosity $T_{liq}$ (poises) | 20000-40000 | | >400000 | >700000 | 100000-300000 |
| $T_{300\ poises}$ (° C.) | 1720 | | 1697 | 1796 | 1704 | 1627 |

| Comparative examples | C7 | C8 | C9 | C10 | C11 |
|---|---|---|---|---|---|
| Composition (weight %) | | | | | |
| $SiO_2$ | 66.9 | 66.2 | 65.7 | 65.7 | 66 |
| $Al_2O_3$ | 16.3 | 16 | 16 | 16 | 18.6 |
| $B_2O_3$ | 4 | 7 | 10 | 10 | |
| CaO | 3.5 | | 2 | | |
| MgO | | 3 | 6 | 2 | |
| $SnO_2$ | 0.3 | 0.3 | 0.3 | 0.3 | 0.3 |
| BaO | 1.5 | 2 | | 2 | |
| SrO | | | | | |
| ZnO | 7.5 | 5.5 | | 4 | 15.1 |
| $Al_2O_3 + B_2O_3 + $ ZnO | 27.8 | 28.5 | 26 | 30 | 33.7 |
| $B_2O_3 + MgO - $ CaO − BaO − SrO | −1 | 8 | 14 | 10 | 0 |
| Properties | | | | | |
| CTE ($\times 10^{-7}$/° C.) | 25 | 24 | 27.6 | 25.8 | 19.2 |
| Tg (° C.) | 744 | 725 | 725 | 723 | 755 |
| Acid durability (half loss in weight – mg/dm²) | 67.9 | 1194 | 1680 | 825 | 177 |
| Alkali durability (loss in weight – mg/dm²) | 148.3 | | 340 | 572 | 285 |
| $T_{liq}$ (° C.) | 1370-1400 | 1350-1400 | 1200-1250 | 1400-1430 | 1450-1500 |
| Viscosity $T_{liq}$ (poises) | 10000-18000 | 7000-10500 | >12000 | 4500-7000 | 1500-3000 |
| $T_{300\ poises}$ (° C.) | 1740 | 1687 | 1610 | 1695 | 1650 |

TABLE 3

| Optical properties (sample thickness: 4 mm) | Example 3 | Example 4 | Example 5 | Keralite® glass-ceramic |
|---|---|---|---|---|
| $Fe_2O_3$ (weight %) | 0.018 | 0.016 | 0.013 | 0.013 |
| Tv (%) (D65 - 2° observer) | 91.3 | 91.1 | 91.6 | 87.6 |
| L*, a*, b* (D65 - 2° observer) | 96.5, −0.11, 0.41 | 96.4, −0.10, 0.40 | 96.7, −0.10, 0.32 | 95.0, −0.47, 4.26 |
| YI (ASTM E313) | 0.72 | 0.72 | 0.57 | 7.72 |

The invention claimed is:

1. A non-crystalline aluminosilicate glass whose composition is free, with the exception of inevitable traces, of alkali metals and contains, expressed as a weight percentage of oxides:
   60 to 70% $SiO_2$
   13 to 22% $Al_2O_3$
   0 to 9% $B_2O_3$
   1 to 6% MgO
   0 to 5% CaO
   1 to 5% BaO
   2 to 12% ZnO, and
   0 to 3% SrO;
   wherein
   $Al_2O_3+B_2O_3+ZnO>23\%$, and
   $B_2O_3+MgO-CaO-BaO-SrO<6\%$, wherein the composition is free of $TiO_2$.

2. The aluminosilicate glass according to claim 1, whose composition contains 5 to 12% ZnO.

3. The aluminosilicate glass according to claim 1, whose composition does not contain SrO with the exception of inevitable traces.

4. The aluminosilicate glass according to claim 1, comprising:
   65 to 70% $SiO_2$
   15 to 20% $Al_2O_3$
   0 to 5% $B_2O_3$
   1 to 4% MgO
   0 to 3% CaO
   1.5 to 4% BaO, and
   5 to 12% ZnO.

5. The aluminosilicate glass according to claim 1, whose composition is free of $B_2O_3$ with the exception of inevitable traces.

6. The aluminosilicate glass according to claim 1, whose composition contains at least 0.1% $B_2O_3$.

7. The aluminosilicate glass according to claim 1, whose composition further contains at least one fining agent.

8. The aluminosilicate glass according to claim 1, whose composition further contains at least one coloring agent.

9. The aluminosilicate glass according to claim 1 whose: coefficient of thermal expansion (CTE) at 20 to 300° C. is lower than $30 \times 10^{-7}$/°C; and acid (half loss in weight per unit surface area) and alkali (loss in weight per unit surface area) chemical durability values, measured as per standard DIN 12-116 and ISO 695 respectively, are less than 400 mg/dm$^2$.

10. The aluminosilicate glass according to claim 1 whose:
    viscosity at liquidus temperature is higher than 300 Pa·s (3000 poises), and
    temperature when the aluminosilicate glass has a viscosity of 30 Pa·s (300 poises) is lower than 1700° C.

11. The use of an aluminosilicate glass according to claim 1 as a substrate for an element chosen from a cooktop for an induction heating cooking device and a glazing, comprising:
    locating the aluminosilicate glass; and
    installing the aluminosilicate glass as a cooktop or glazing.

* * * * *